United States Patent [19]

Hicks, Jr. et al.

[11] Patent Number: 4,678,253
[45] Date of Patent: Jul. 7, 1987

[54] BUS DUCT HAVING IMPROVED BUS BAR CLAMPING STRUCTURE

[75] Inventors: Loy A. Hicks, Jr., Nazareth; Edward P. Sherwood, Allentown; Thomas J. Saks, Bethlehem, all of Pa.

[73] Assignee: Eaton Corporation, Cleveland, Ohio

[21] Appl. No.: 724,954

[22] Filed: Apr. 22, 1985

Related U.S. Application Data

[63] Continuation-in-part of Ser. No. 665,480, Oct. 29, 1984.

[51] Int. Cl.⁴ .............................................. H02G 5/08
[52] U.S. Cl. ................................... 439/210; 174/68 B
[58] Field of Search ................ 339/22 B, 22 R, 21 R, 339/21 S, 20, 23, 24; 174/99 B, 68 B

[56] References Cited

U.S. PATENT DOCUMENTS

| | | | |
|---|---|---|---|
| 3,012,218 | 12/1961 | Cataldo | 339/22 |
| 3,072,736 | 1/1963 | Wallace | 339/22 B |
| 3,636,237 | 1/1972 | Hafer | 174/68 B |
| 3,639,676 | 2/1972 | Dempsey, Jr. et al. | 174/68 B |
| 3,683,313 | 8/1972 | Weimer et al. | 339/22 B |
| 3,710,302 | 1/1973 | Shannon et al. | 339/22 B |
| 3,731,256 | 5/1973 | Hafer | 339/22 B |
| 3,732,353 | 5/1973 | Koenig et al. | 174/99 B |
| 3,922,053 | 11/1975 | Hafer | 339/22 B |

*Primary Examiner*—Gil Weidenfeld
*Assistant Examiner*—Thomas M. Kline

*Attorney, Agent, or Firm*—D. A. Rowe; L. G. Vande Zande

[57] ABSTRACT

A plurality of wide flat bus bars (A,B,C,N) stacked in flat face-to-face relation are clamped against separation forces of short circuit currents in the bus bars by U-shaped reinforcement channels (6,14) disposed over opposite edges of the bus bars with bight portions (6a,14a) of said channels abutting the edges of the bus bars and leg portions (6b,14b) thereof extending along flat surfaces of outer ones of said bus bars. A plurality of bolts (8) through aligned holes in outwardly directed flanges (6c,14c) formed on the free ends of the legs of the channels and are threadably tightened to draw the channels together and to exert a clamping force against the flat faces of the bus bars. A flat sided housing (16,24) is attached to the channels (6,14) and may be provided with access openings (16a) at intervals therealong for making plug-in connections with the bus bars. Insulators (32) positioned within the openings (16a) have flanges (32a) overlying the housing at peripheral edgess of the openings (16a) and are clamped between the housing and an overlying shroud (34) by fastening means (36) passing through the shroud, flanges, and housing. Double insulation may be provided for the bus duct by substituting reinforcement channels (46) which may be insulation coated or formed of insulating material.

37 Claims, 7 Drawing Figures

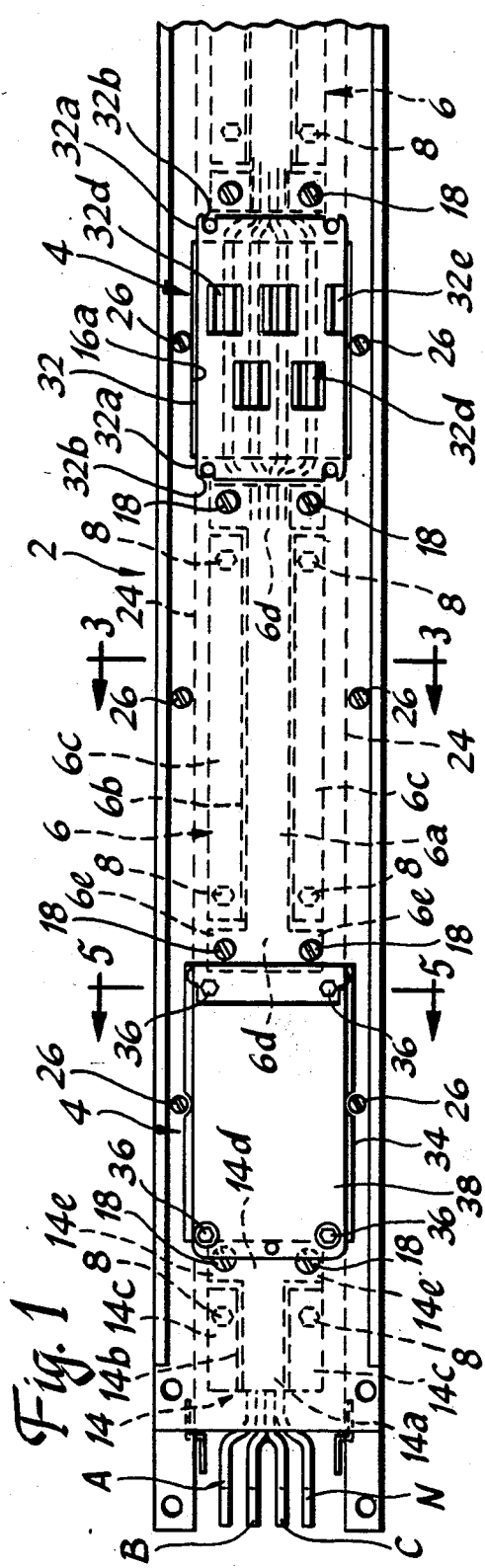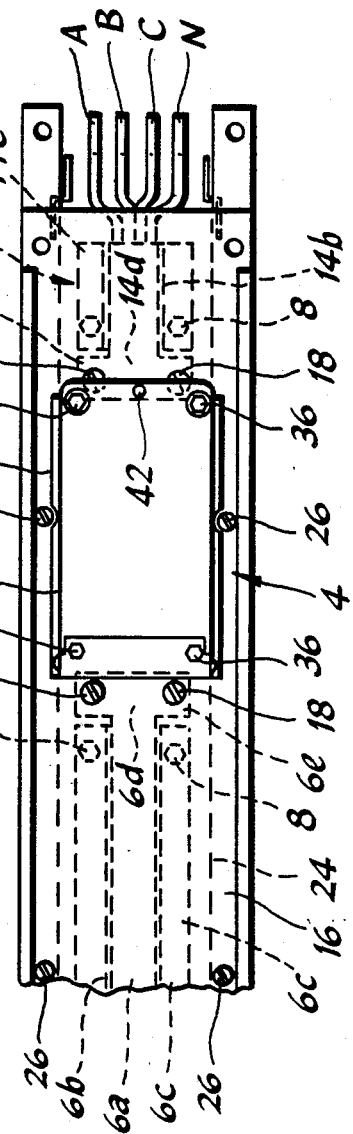

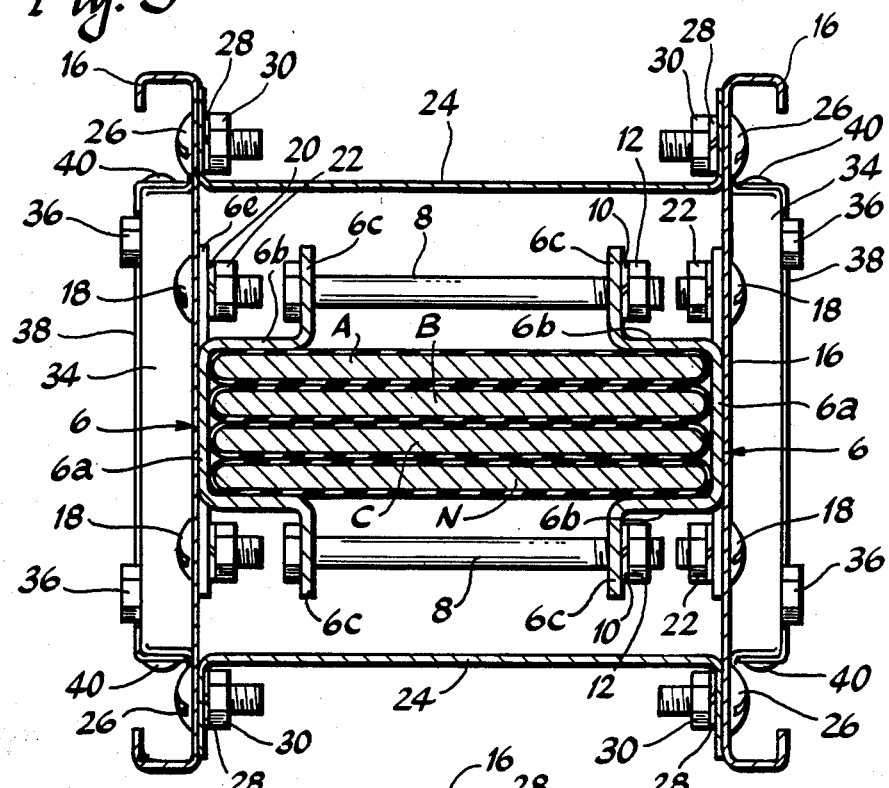
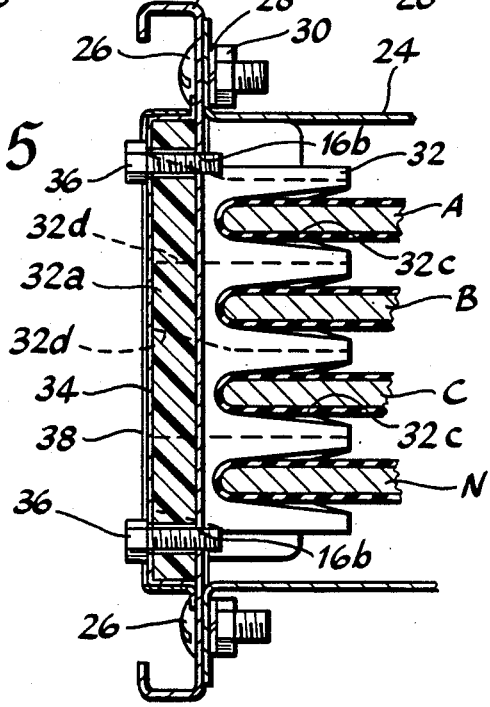

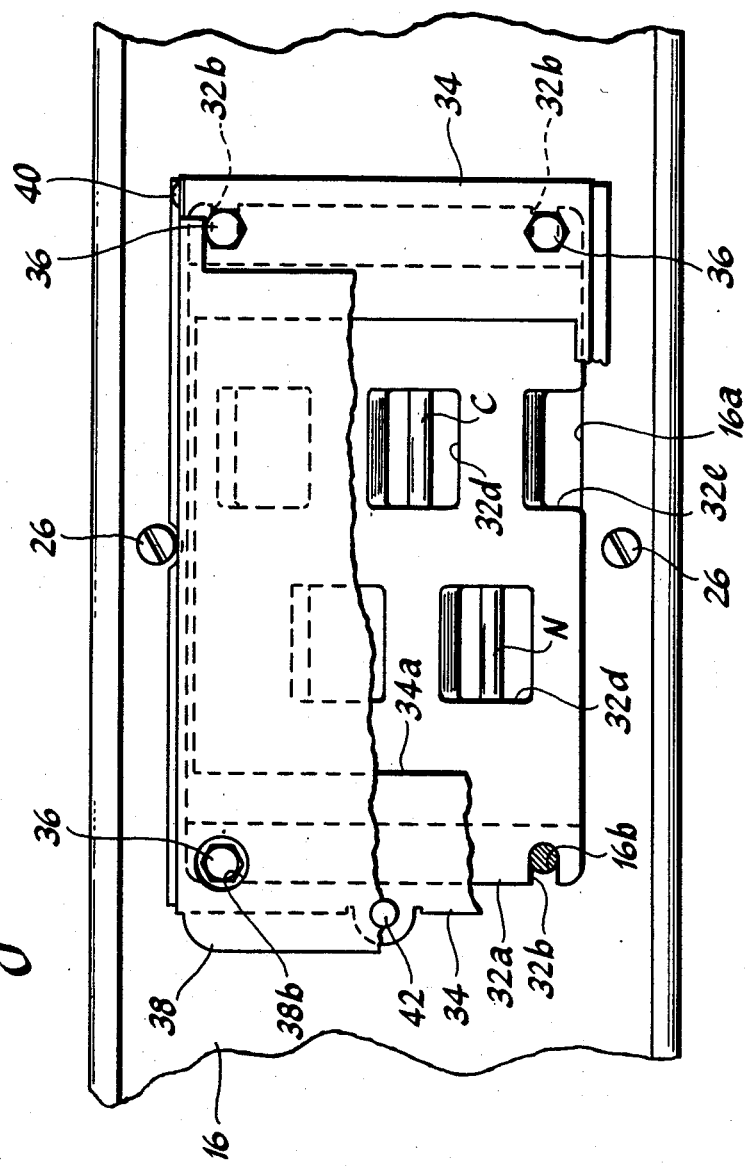

BUS DUCT HAVING IMPROVED BUS BAR CLAMPING STRUCTURE

CROSS REFERENCE TO RELATED APPLICATION

This application is a continuation-in-part of copending patent application Ser. No. 665,480, filed Oct. 29, 1984.

BACKGROUND OF THE INVENTION

This invention related to electric bus duct and more particularly relates to an improved clamping structure for the bus bars which withstands blow-apart forces in the bus bars under short circuit conditions and therefore enables an external housing of the bus duct to be readily and economically fabricated and assembled.

State-of-the-art bus duct designs typically incorporate the external metal housing as an integral part of the bus bar support and clamping structure for increasing the strength of the clamping and supporting arrangement. Plug-in sections of bus duct which utilize straight flat bus bars spaced apart along their length have utilized corregated side members of the housing for engaging and supporting the opposite edges of the bus bar along the length of the bus stop. Another type of plug-in bus duct has wide flat insulated bus bars arranged with flat surfaces thereof in intimate contact with each other for reducing inductive losses, such bus bars being offset at plug-in intervals to provide necessary access for plug-in connection to the bus bars. Bus duct sections of the latter type typically have irregularly formed top and bottom housing members which are in contact with flat surfaces of the bus bars in the areas between the access openings and are offset similarly to the bus bars at the plug-in openings. Each of these approaches provides an external housing which has irregularly shaped surfaces which are costly to manufacture, require particular attention to clamping and securing the housing parts and bus bars together during assembly, are difficult to seal around when the bus duct is required to be installed through a wall of the building or the like, and which provide pockets on the upper external surface which accumulate water when used in outdoor applications.

SUMMARY OF THE INVENTION

This invention provides a bus duct assembly wherein the bus bars are arranged and clamped together in a manner providing total support for the bus bars for withstanding short circuit forces tending to drive the bus bars apart. The metal housing for the bus duct is disposed over the clamped bus bar assembly and is secured thereto by attaching a first pair of opposite side thereof the bus bar assembly and then attaching a second pair of opposed sides to the first pair of sides. An alternative embodiment of this invention provides a double insulated clamped bus bar assembly. An improved insulator retaining structure is provided for entrapping insulators at each plug-in access opening.

The invention and its advantages will become more apparent when reading the following description and claims in conjunction with the accompanying drawings.

BRIEF DESCRIPTION OF THE DRAWINGS

FIG. 1 is a side view of a left-hand end of a plug-in bus duct constructed in accordance with this invention;

FIG. 2 is a side view of a right-hand end of the bus duct of FIG. 1;

FIG. 3 is a cross sectional view of the bus duct of this invention taken along line 3—3 in FIG. 1, and drawn to a larger scale;

FIG. 4 is an enlarged view of a section of the bus duct of FIG. 1 showing a plug-in opening thereof;

FIG. 5 is a partial cross sectional view taken along line 5—5 in FIG. 1, and drawn to an enlarged scale.

DESCRIPTION OF THE PREFERRED EMBODIMENT

A left-hand end segment of bus duct structure 2 constructed in accordance with this invention is shown in FIG. 1. The bus duct 2 may be manufactured in varying predetermined lengths and has a plurality of plug-in openings 4 located at regularly spaced intervals along the opposite sides thereof. The right-hand end of the bus duct 2 is shown in FIG. 2 and may be taken as being placed in endwise alignment adjacent the right-hand end of FIG. 1. The number of plug-in openings 4 provided in any particular section of bus duct is determined by the desired length of the bus duct. In practice, a ten foot length of bus duct may typically have five plug-in openings on each side.

Figure 7:
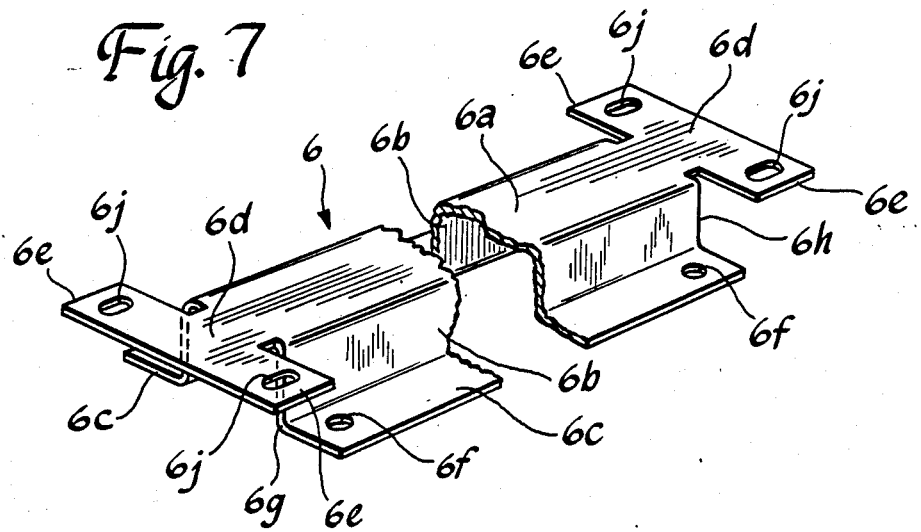
FIG. 7 is a perspective view of a U-shaped channel member of this invention.

A plurality of bus bars A, B, C and N are disposed within the bus duct structure 2. In some applications, the bus bar N may be omitted wherein the bus bar assembly will then comprise only three bus bars A, B and C. Referring also to FIG. 3, the bus bars are elongated members having a wide, flat cross sectional shape which extend over the entire length of the bus duct structure 2. As seen in FIG. 3, the bus bars are individually surrounded with an insulation and are arranged with their wide, flat surfaces in face-to-face intimate contact. The bus bars are offset outwardly of planes containing the flat surfaces at regularly spaced intervals along the length thereof corresponding to the plug-in openings 4 and at the right and left-hand opposite ends thereof to provide access spacing between the respective bus bars for making electrical connection thereto. The portions of the bus bars which are in face-to-face contact are clamped together by elongated U-shaped reinforcement channels 6 disposed over opposite edges of the bus bars as seen in FIG. 3. With reference also to FIG. 7, channels 6 comprise a bight portion 6a which abuts the edges of the respective bus bars and a pair of leg portions 6b which extend from the bight portion 6a along the outer flat face of the outermost bus bars A and N. The free ends of legs 6b are formed at right angles to the legs to provide outwardly directed projections 6c which extend away from the flat faces of the respective outermost bus bars. Each projection 6c is provided with openings 6f (FIG. 7) at respective opposite ends 6a and 6b (FIG. 7) of the reinforcement channel for receiving a bolt 8 which extends through the resepctive aligned openings of opposed reinforcement channels 6. A lock washer 10 and nut 12 are assembled on the end of each bolt 8 extending beyond the opposite projection 6c. When bolts 8 and nuts 12 are tightened, they serve to draw the opposed reinforcement channels 6 together such that the bight portions 6a are pressed firmly into engagement with the edges of the respective bus bars.

More significantly, tightening of bolts 8 and nuts 12 provides a bending moment for legs 6b about their respective attachment points with bight portion 6a to cause the legs 6b of each reinforcement channel 6 to be urged inwardly toward each other, thereby providing an inwardly directed clamping force against the flat face of the bus bars to clamp the bus bars tightly together in face-to-face relation. The reinforcement channels 6 and the clamping bolts 8 and nuts 12 provide total structural retention of the bus bars for resisting th electromagnetic forces which tend to separate the bus bars under high short circuit conditions. Opposed pairs of reinforcement channels 6 are provided between each adjacent pair of plug-in openings 4. Shortened reinforcement channels 14 are provided at each end of the bus duct between the respective end and the adjacent plug-in opening 4. Reinforcement channels 14 have only a single pair of openings for receiving bolts 8, but otherwise are similar to channel 6 in that they have a bight portion 14a, a pair of leg portions 14b and a pair of outwardly directed projections 14c at the free ends of legs 14b.

The opposite ends of channels 6 are slotted transversely to the lengthwise dimension of the channel to define the ends of legs 6b and projections 6c. The bight portion 6a extends beyond the ends of legs 6b and projections 6c in each lengthwise direction of the channel to provide mounting tabs 6d which are coplanar with the bight portion 6a. In the preferred embodiment, tabs 6d have wing portions 6e which extend in opposite lateral directions from tab portions 6d. Wings 6e are provided with holes 6j (FIG. 7) therethrough. Similarly, reinforcement channels 14 are provided with tabs 14d having wings 14e extending in opposite lateral directions therefrom and which have holes therethough (not shown).

A first pair of housing side members 16 are disposed in opposed relationship against the bight portions of respective opposed reinforcement channels 6 and 14. Housing members 16 are provided with holes arranged to be in alignment with the aforementioned holes provided in the respective wings 6e and 14e of the reinforcement channels. Screws 18 are disposed through the respective aligned holes in side members 16 and wings 6e or 14e and each receive a lock washer 20 and nut 22 thereon to attach the side members 16 to the reinforcement channels 6 and 14. A pair of top and bottom housing members 24 are disposed between opposed side members 16. Top and bottom members 24 are shallow U-shaped channel members having right-angled leg portions along the opposite edges thereof. These leg portions and the housing side members 16 are provided with correspondingly aligned holes at regular intervals along the length thereof for receiving screws 26 therethrough. The latter receive lock washers 28 and nuts 30 thereon for securing the top and bottom housing members 24 to the opposed side members 16 of the housing. The top and bottom members 24 are spaced away from the reinforcement channels 6 and 14 to form a hollow elongated rectangular box housing about the bus bar assembly. Inasmuch as separation forces in the bus bars under short circuit conditions are totally absorbed by the reinforcement channels 6 and 14 and the associated clamping structure of bolts 8 and nuts 12, other more expedient and less costly fastening means such as self tapping screws, sheet metal screws, pop rivets or the like may be sustituted for screws 18 and 26 and respective nuts 22 and 30. Housing side members 16, although formed with reversed U-shaped channels along the top and bottom edges thereof for purposes of installing the bus duct and for mounting plug-in attachment units to the bus duct, are essentially long flat members. Similarly, top and bottom housing members 24 are essentially long flat members having only simple right-angle flanges along their edges. The fabrication of flat housing members provides a significant manufacturing cost savings as well as providing a uniform cross sectional shape for the bus duct. The latter is particularly significant when the installation of the bus duct requires that it pass through a structural wall and for the juncture of the bus duct and wall to be sealed.

Figure 6:
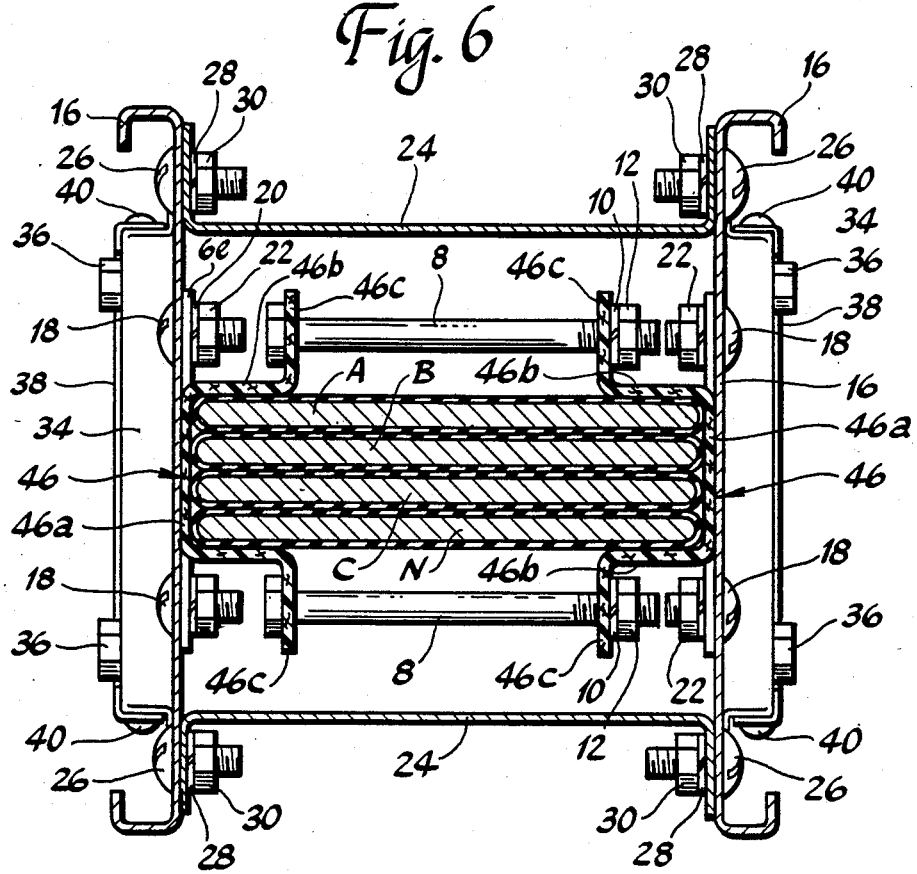
FIG. 6 is a cross sectional view of the bus duct of this invention, similar to FIG. 3, but showing an alternative embodiment thereof.

The clamped bus bar structure hereinbefore described affords another advantage in that such structure may be double insulated with respect to the housing. With reference to FIG. 6, electrically insulating reinforcement channels 46 are substituted for reinforcement channels 6. The channels 46 may be metal members coated with an electrical insulating material. Preferrably, however, the channels 46 are made entirely of an insulating material such as glass reinforced polyester or the like as specifically shown in FIG. 6. Although not shown, the shortened end reinforcement channels 14 are also substituted for by insulating channels. In this embodiment, the housing side members 16 are attached to an insulating member. Thus, in the event that the insulation surrounding bus bars A, B, C and N should become crushed or otherwise damaged by violent movement of the bus bars under the high mechanical stresses induced by short circuit conditions, the insulating reinforcement channels will prevent the occurrance of a short circuit between the bus bars and the housing. The double insulated system also affords a significant advantage when the bus duct is used in outdoor or other applications subject to moisture conditions.

The housing side members 16 are provided with openings 16a at the plug-in openings 4 of the bus duct. One such opening 16a is shown at the right-hand end of FIG. 1 wherein a cover and shroud assembly are removed from the bus duct. Each plug-in opening 16a has a molded insulator block 32 disposed therein as seen at the right-hand end of FIG. 1 and as shown in cross sectional view of FIG. 5. The flat surface of housing side members 16 has enabled the insulator block 32 to be made with an improved mounting means over those previously used. The front portion of insulator block 32 has flanged end portions 32a which overlie the external surface of housing side members 16 at the peripheral edges of opening 16a. The flanges 32a are provided with a pair of slots 32b which are open to the respective ends of the insulator 32. The rear portion of insulator block 32 is provided with a plurality of grooves 32c which individually receive the respective bus bars A–N. A plurality of openings 32d are formed in the block 32 to extend therethrough from the external surface to a respective one of the bus bars A–N for providing an access opening for making electrical connection with the respective bus bar. A fifth opening 32e is provided along a lower edge of the block 32 to provide connection access to a ground bus bar if the same is utilized in the bus duct.

A metal frame member 34 is disposed over the insulator block 32 as shown best in FIGS. 4 and 5. The frame member 34 has an opening 34a which exposes the front surface of the insulator block 32 and the openings 32d and 32e formed therein. The frame member 34 has flanges formed over along the edges thereof to extend along the peripheral edges of insulator block 32 for engagement with the exterior surface of housing side member 16. Four hexangonal thread cutting screws are inserted through respective openings in frame member 34 to extend through slots 32b and take into aligned openings 16b (FIG. 5) in housing side member 16 to secure the insulator block and the frame member in place at the respective plug-in openings 4. This construction enables the flanges 32a of insulator block 32 to be clamped firmly between the side of the housing 16 and the frame member 34, thereby positively locking the insulator block in place and affording additional strength to the insulator block during short circuit conditions. A cover 38 is attached to frame member 34 by a pair of plastic press-in pins 40 which pass through respective aligned holes in cover 38 and shroud 34. As seen best in FIG. 4, cover 38 is notched at its right-hand end to clear the right-hand end bolts 36 and is provided with holes 38b at its left-hand end which provide clearance for the cover with respect to the left-hand bolts 36. Cover 38 extends beyond the left-hand end of frame member 34. The pins 40 serve as hinges to enable the cover 38 to be pivotally moved away from the housing and frame member 34. A plastic push-pin 42 is provided in an opening in the left-hand end of cover 38 to be cooperably received in an aligned opening in shroud 34 for latching the cover in place.

While the bus duct having improved bus bar clamping structure of this invention has been described in conjunction with a plug-in bus section wherein the bus bars are offset to form spaced connection access portions at predetermined spaced intervals along the length thereof, the same may be employed in a feeder bus duct wherein the bus bars are offset only at the opposite ends and are arranged in stacked flat face-to-face relation over the entire length between the offset ends. In such arrangement, a plurality of reinforcement channels 6 or 46 are disposed over the opposite edges of the bus bars in a series relationship. The housing side members 16 and top and bottom members 24 are secured as in the foregoing description, thereby providing a uniform cross sectional shape for both plug-in and feeder bus ducts. It is to be understood that the bus duct structure of this invention is susceptible to modification other than described herein without departing from the scope of the appended claims.

We claim:

1. A bus duct comprising, in combination:
   a plurality of wide flat bus bars arranged in stacked relation with flat surfaces of each bus bar in face-to-face engagement with contiguous flat surfaces of adjacent bus bars;
   U-shaped reinforcement members disposed over opposite edges of said stacked bus bars with bight portions of said members abutting respective edges of said stacked bus bars and legs of each member extending along outermost flat surfaces of said stacked bus bars toward corresponding legs of a respective opposed member, free ends of said legs being disposed outwardly from said outer flat surfaces; and
   clamping means engaging said outwardly disposed free ends of opposed ones of said reinforcement members for urging said members together against said edges of said stacked bus bars and for applying a bending moment to said legs about respective junctures thereof with said bight portions for urging said legs inwardly against said flat surfaces of said stacked bus bars for compressing said bus bars together in face-to-face relation.

2. The invention defined in claim 1 wherein said reinforcement members have a length in a direction transverse to said U-shape which is greater than the distance between said legs of said U-shape to comprise elongaged U-shaped channels having outwardly disposed free ends of said legs.

3. The invention defined in claim 2 wherein said clamping means are disposed at spaced intervals along the elongated length of respective ones of said channels.

4. The invention defined in claim 2 wherein said clamping means are disposed at opposite ends of said channels.

5. The invention defined in claim 2 wherein a plurality of said channels are serially disposed over opposite edges of said stacked bus bars.

6. The invention defined in claim 5 wherein said clamping means are disposed at opposite ends of said channels.

7. The invention defined in claim 2 wherein said channels comprise tabs at opposite ends thereof for attaching a first pair of opposed housing members to said channels.

8. The invention defined in claim 7 wherein said tabs comprise extensions of said bight portions of said channels having transversely extending wings for providing spaced attachment points for said first pair of opposed housing members at each end of said channels.

9. The invention defined in claim 8 wherein a second opposed pair of housing members are secured to said first opposed pair of housing members in spaced relation to said reinforcement members.

10. The invention defined in claim 2 wherein said bus bars have portions offset away from adjacent bus bars for providing spaces between flat surfaces of respective adjacent bus bars at spaced intervals along the length of said bus bars; and
    said channels are disposed over opposite edges of said stacked bus bars along flat reaches of said bus bars between said offset portions.

11. The invention defined in claim 2 wherein said clamped reinforcement channels provide full structural restraint for said stacked bus bars against separation forces generated by short circuit currents in said bus bars, and said bus duct further comprises a housing having a first pair of opposed housing members attached to said channels along said bight portions thereof, and a second pair of opposed housing members attached to said first pair of opposed housing members to extend therebetween in spaced relation to said stacked bus bars, reinforcement channels and clamping means.

12. The invention defined in claim 11 wherein said bus bars have portions offset away from adjacent bus bars for providing spaces between flat surfaces of respective adjacent bus bars at spaced intervals along the length of said bus bars for providing access to individual ones of said bus bars for making electrical connections thereto and said channels are disposed over opposite edges of said stacked bus bars along flat reaches of said bus bars between said offset portions.

13. The invention defined in claim 12 wherein said first pair of opposed housing members are provided with openings in correspondence with said offset portions of said bus bars, each said opening being provided with an insulator assembly for electrically isolating individual ones of said bus bars with respect to the exterior of said housing.

14. The invention defined in claim 13 wherein each said insulator assembly comprises an insulator block having a plurality of grooves for individually receiving said bus bars, apertures through said block individually communicating with a respective bus bar, flanges abutting an exterior surface of a respective first housing member, and means attaching said flanges to said respective first housing member.

15. The invention defined in claim 14 wherein said insulator assembly further comprises a metal frame member surrounding said insulator block and overlying said flanges on said exterior surface of said respective first housing member and said attaching means clamping said flanges between said frame member and said exterior surface.

16. The invention defined in claim 1 wherein said U-shaped reinforcement members comprise electrically insulated members.

17. The invention defined in claim 1 wherein said U-shaped reinforcement members comprise electrical insulating material.

18. The invention defined in claim 17 wherein said U-shaped reinforcement members are formed of glass reinforced polyester.

19. The invention defined in claim 16 wherein said reinforcement members have a length in a direction transverse to said U-shape which is greater than the distance between said legs of said U-shape to comprise elongated U-shaped channels having outwardly disposed free ends of said legs.

20. The invention defined in claim 19 wherein said clamping means are disposed at spaced intervals along the elongated length of respective ones of said channels.

21. The invention defined in claim 19 wherein said clamping means are disposed at opposite ends of said channels.

22. The invention defined in claim 19 wherein a plurality of said channels are serially disposed over opposite edges of said stacked bus bars.

23. The invention defined in claim 22 wherein said clamping means are disposed at opposite ends of said channels.

24. The invention defined in claim 19 wherein said channels comprise tabs at opposite ends thereof for attaching a first pair of opposed housing members to said channels.

25. The invention defined in claim 24 wherein said tabs comprise extensions of said bight portions of said channels having transversely extending wings for providing spaced attachment points for said first pair of opposed housing members at each end of said channels.

26. The invention defined in claim 25 wherein a second opposed pair of housing members are secured to said first opposed pair of housing members in spaced relation to said reinforcement members.

27. The invention defined in claim 16 wherein said bus bars have portions offset away from adjacent bus bars for providing spaces between flat surfaces of respective adjacent bus bars at spaced intervals along the length of said bus bars; and
said channels are disposed over opposite edges of said stacked bus bars along flat reaches of said bus bars between said offset portions.

28. The invention defined in claim 16 wherein said clamped reinforcement channels provide full structural restraint for said stacked bus bars against separation forces generated by short circuit currents in said bus bars, and said bus duct further comprises a housing having a first pair of opposed housing members attached to said channels along said bight portions thereof and a second pair of opposed housing members attached to said first pair of opposed housing members to extend therebetween in spaced relation to said stacked bus bars, reinforcement channels and clamping means.

29. The invention defined in claim 28 wherein said bus bars have portions offset away from adjacent bus bars for providing spaces between flat surfaces of respective adjacent bus bars at spaced intervals along the length of said bus bars for providing access to individual ones of said bus bars for making electrical connections thereto and said channels are disposed over opposite edges of said stacked bus bars along flat reaches of said bus bars between said offset portions.

30. The invention defined in claim 29 wherein said first pair of opposed housing members are provided with openings in correspondence with said offset portions of said bus bars, each said opening being provided with an insulator assembly for electrically isolating individual ones of said bus bars with respect to the exterior of said housing.

31. The invention defined in claim 30 wherein each said insulator assembly comprises an insulator block having a plurality of grooves for individually receiving said bus bars, apertures through said block individually communicating with respective bus bar, flanges abutting an exterior surface of a respective first housing member, and means attaching said flanges to said respective first housing member.

32. The invention defined in claim 31 wherein said insulator assembly further comprises a metal frame member surrounding said insulator block and overlying said flanges on said exterior surface of said respective first housing member and said attaching means clamping said flanges between said frame member and said exterior surface.

33. A bus duct comprising, in combination:
an elongated hollow metal housing having side openings at longitudinally spaced intervals;
a plurality of wide flat bus bars stacked with flat surfaces in face-to-face engagement supported in said housing with edges of said bus bars adjacent said side openings, said bus bars being offset to establish spaces between said flat surfaces at longitudinally spaced intervals corresponding to said openings in said housing;
means independent of said housing for compressively clamping said bus bars together for withstanding separation forces generated by short circuit currents in said bus bars;
insulator members disposed in each said opening, each said insulator member having grooves for individually receiving said bus bars, apertures through said member individually communicating with respective ones of said bus bars, and flanged portions overlying an external surface of said housing adjacent said opening;
metal frame members individually disposed over each of said insulator members for engagement with an external surface of said housing;
fastening means for securing said frame members to said housing for clamping said insulator members flanged portions between a respective frame member and said housing external surface; and wherein said means for compressively clamping said bus bars together comprises U-shaped reinforcement channels disposed over opposite edges of said bus bars along flat reaches thereof between said longitudinally spaced offset portions, said U-shaped channels having legs extending along outer flat surfaces of outermost ones of said stacked bus bars toward respective legs of an opposed channel, free ends of said legs projecting away from said bus bars, and clamping means engaging said free ends of said legs of opposed reinforcement channels for urging said reinforcement channels together against said edges of said bus bars and for applying a bending moment to said legs about respective junctures thereof with bight portions of said channels for urging said legs against said outer flat surfaces of said bus bars for compressing said stacked bus bars in flatwise relation.

34. The invention defined in claim 33 wherein said reinforcement channels comprise tabs at opposite ends thereof for attaching said channels to side portions of said housing for supporting said stacked bus bars within said housing.

35. The invention defined in claim 33 wherein said U-shaped reinforcement members comprise electrically insulated members.

36. The invention defined in claim 33 wherein said U-shaped channels comprise electrical insulating material.

37. The invention defined in claim 36 wherein said U shaped channels are formed of glass reinforced polyester.

* * * * *